United States Patent
Boston et al.

(10) Patent No.: US 7,430,316 B2
(45) Date of Patent: Sep. 30, 2008

(54) METHOD FOR VISUALLY ACCURATELY PREDICTING COLOR MATCHES ON DIFFERENT MATERIALS

(75) Inventors: Christopher J. Boston, Morrisville, PA (US); Kwok Ching Lau, Tseun Wan (HK)

(73) Assignee: Datacolor Holding AG, Lucerne (CH)

( * ) Notice: Subject to any disclaimer, the term of this patent is extended or adjusted under 35 U.S.C. 154(b) by 889 days.

(21) Appl. No.: 10/767,150

(22) Filed: Jan. 29, 2004

(65) Prior Publication Data

US 2005/0169518 A1    Aug. 4, 2005

(51) Int. Cl.
G06K 9/00    (2006.01)
(52) U.S. Cl. ...................... 382/162; 382/209
(58) Field of Classification Search ............. 382/162, 382/164, 165, 166, 209; 359/726, 741, 444, 359/448, 457; 435/6, 252.3; 530/300, 344, 530/350, 412; 715/722; 358/523; 356/405, 356/223, 416, 419; 345/88, 549; 348/180
See application file for complete search history.

(56) References Cited

U.S. PATENT DOCUMENTS

| | | | | |
|---|---|---|---|---|
| 5,272,518 A * | 12/1993 | Vincent | ...................... | 356/405 |
| 5,909,291 A * | 6/1999 | Myers et al. | ................. | 358/523 |
| 5,963,201 A * | 10/1999 | McGreggor et al. | ......... | 715/722 |
| 5,973,801 A | 10/1999 | Bresler | ....................... | 358/520 |
| 6,014,221 A | 1/2000 | Plude, Jr. | ..................... | 356/402 |
| 6,246,471 B1 | 6/2001 | Jung et al. | ..................... | 356/73 |
| 6,362,849 B1 | 3/2002 | Caisey-Bluteau et al. | ........................ | 348/222.1 |
| 6,437,865 B1 | 8/2002 | Willing | ....................... | 356/244 |
| 6,824,981 B2 * | 11/2004 | Chait et al. | .................... | 435/6 |
| 7,054,077 B2 * | 5/2006 | Hill | ............................. | 359/726 |

OTHER PUBLICATIONS

Roberts, J., "Color Matching Problems in the Paint Industry," Duron, Inc., http://slp.nist.gov/appearance/roberts.pdf.
Hohl, D., "Color Matching: Controlling Ink Deposit for Accurate Matches," SPTF Practical Application Bulletin, pp. 1-19, Date Unknown, http://www.sgia.org/sptf/pdf/colormatching.pdf.
"Texture Mapping", Chapter 2, www.cg.tuwien.ac.at/studentwork/CESCG97/olearnik/txmap.htm, printed Dec. 9, 2002, Date Unknown.
"Materials", Chapter 10, www.anim8or.com/manual8/10_materials.html, printed Dec. 9, 2002, Date Unknown.
"Working with Objects, Textures, and materials," DataCAD Plus vis, Chpt 5, p. 92-106, date Unknown.
PCT Search Report and Written Opinion for PCT/US05/03152, Jun. 30, 2008, copy consists of 9 unnumbered pages.

* cited by examiner

*Primary Examiner*—Anh Hong Do

(57) ABSTRACT

An example method uses a spectrophotometer to collect reflectance curve data from a physical sample colored to a desired color. The reflectance curve data is employed to produce computer display outputs of substrates as they would be appear if colored with the desired color. The method includes using a colorimeter to collect calorimetric data from the outputs on the display. The sets of colorimetric data are compared and data that facilitate manipulating the reflectance curve data associated with the desired color is produced. The synthetic reflectance curve data facilitates producing matches for the various substrates as colored and displayed on the computer display. The synthetic reflectance curve data may also be used to manipulate colorant formulae.

16 Claims, 18 Drawing Sheets

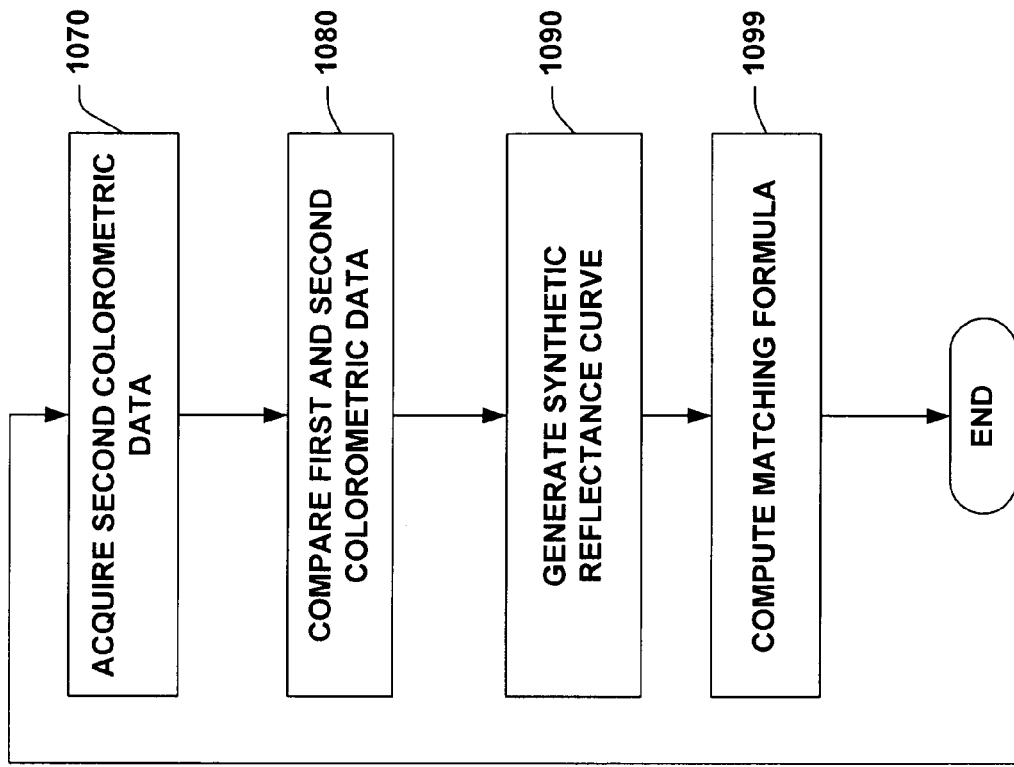
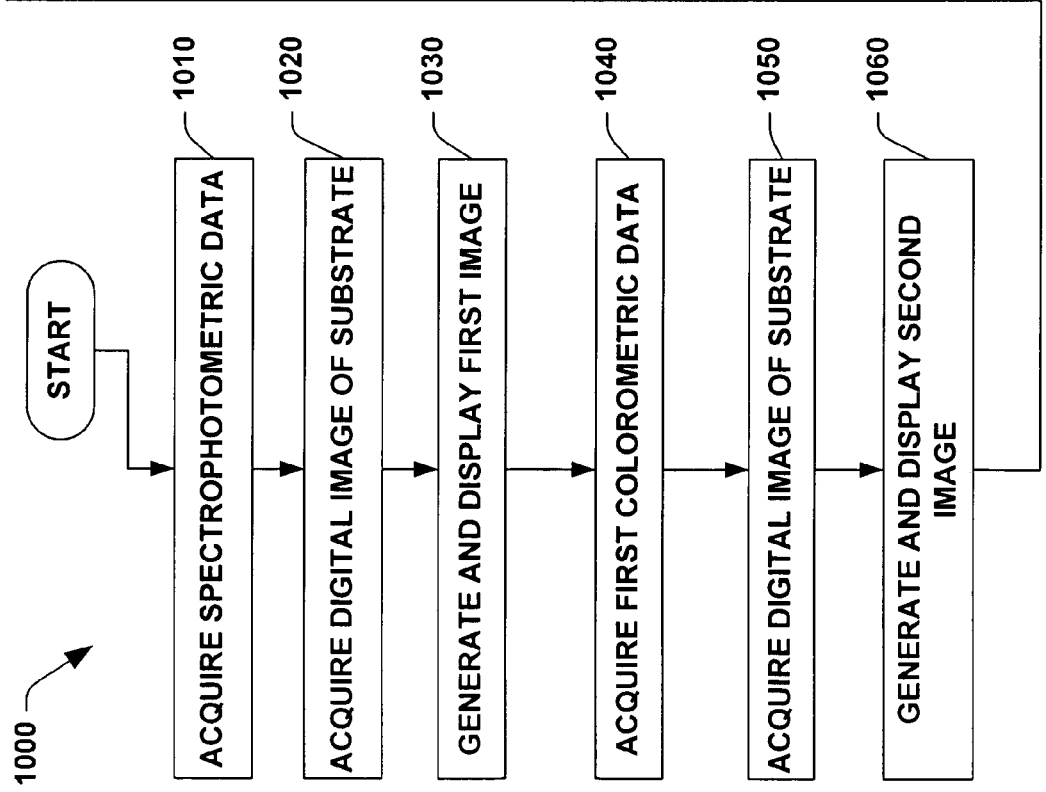
Fig. 10

METHOD FOR VISUALLY ACCURATELY PREDICTING COLOR MATCHES ON DIFFERENT MATERIALS

TECHNICAL FIELD

The systems, methods, application programming interfaces (API), graphical user interfaces (GUI), data packets, and computer readable media described herein relate generally to computer programming and more particularly to acquiring and manipulating reflectance curve data to facilitate matching colors on materials with different properties (e.g., texture, construction).

BACKGROUND

Materials with different properties like texture, construction, opacity, and so on reflect light differently. Thus, when the same colorant is applied to materials with different properties the two colored materials may have different appearances. For example, a first shade of blue paint, applied to a substantially smooth surface may have a different appearance than the same shade of blue paint when applied to a textured surface. Similarly, a first shade of red dye may yield a first appearance when applied to a cotton knitted garment and a second appearance when applied to a cotton woven garment. Apparent color mismatches are also evidenced in color matching that attempts to cross product lines. For example, a first shade of green may have a first appearance on a football jersey, a second appearance on a poster promoting the team with the green jerseys, a third appearance on a toy rubber football promoting the team with the green jerseys, a fourth appearance on a promotional foam finger, a fifth appearance on a team key chain, a sixth appearance on a cotton baby outfit, and so on. Ideally, to enhance marketing and promotion, the green would appear substantially identical on all products, regardless of the material and/or substrate on which the color appears.

Matching colors on materials with different properties has historically been undertaken in applications including, but not limited to, textile dyeing, leather tanning, leather dying, plastics master-batching, coatings, point of sale paints, trade sale paints, wood stains and so on. Typically, color matching on materials with different properties has relied on a human technician applying intuition, experience and ad hoc methods. Thus, varying results may be attained due to the varying levels of technician experience, skill, visual capacity for discerning color differences, and estimating—based on experience in color matching—the combination and proportions of colorants employed to match a color on two or more substrates. By way of illustration, a color formula for a latex paint may be an ideal match when the paint is applied to a flat, non-porous surface. However, when the same latex paint is applied to a highly textured surface, it will appear to be unacceptably off-color. Commercially this causes customer complaints, returns and so on.

SUMMARY

Improved, automated, repeatable methods for color matching on materials with different properties is desired. Thus, the following summary presents a simplified overview of methods, systems, computer readable media and so on for automated color matching on different materials using acquired, manipulated, and synthetic reflectance curve data to facilitate providing a basic understanding of these items. This summary is not an extensive overview and is not intended to identify key or critical elements of the methods, systems, computer readable media, and so on or to delineate the scope of these items. This summary provides a conceptual introduction in a simplified form as a prelude to the more detailed description that is presented later.

The application describes systems and methods for determining a predicted color match between dissimilar materials using reflectance data from a "standard object" and an electronically computed "compensation" to the "standard" color derived from digital imaging on a calibrated computer monitor (e.g., cathode ray tube (CRT) or other similar device for displaying computer output) that equalizes the observed color in and/or on materials with different surface qualities. In one example, the resulting synthesized reflectance data is then employed in formulating a matching colorant.

One example method includes using a spectrophotometer to collect measurement data, in the form of a reflectance curve data, from an actual physical sample colored to the desired color. The method includes accessing a computer on which digital images, representations, and/or models of various substrates are stored. The digital images, representations, and/or models of the various substrates are stored in the computer in a manner that facilitates producing an output on a computer display, where the output will be the substrate as it would appear when colored with the color on the actual physical sample from which the reflectance curve data was acquired using the spectrophotometer.

Thus, the example method includes producing an output on the display of a first substrate as it would be appear if colored with the color on the actual physical sample from which the reflectance curve data was acquired using the spectrophotometer. The example method then includes using a calorimeter to collect calorimetric data from the output on the display, where the calorimetric data can be employed to characterize, evaluate, measure and/or record the color of the first substrate produced on the output display.

The method then includes producing an output on the display of a second substrate as it would be appear if colored with the color on the actual physical sample from which the reflectance curve data was acquired using the spectrophotometer. The example method then includes using a colorimeter to collect calorimetric data from the output on the display, where the calorimetric data can be employed to characterize, evaluate, measure and/or record the color of the second substrate produced on the output display.

Once the colorimetric data has been acquired for the two substrates as rendered by the color from the actual physical sample, the two sets of calorimetric data can be processed to determine similarities and/or differences between the two colors produced on the output display. In one example, a compensation value is produced that facilitates creating synthetic reflectance curve data. The synthetic reflectance curve data can then be employed to manipulate the original reflectance curve data acquired from the actual physical object that was colored to the desired color. The synthetic reflectance curve data thus facilitates matching the output appearance of the second substrate as colored to the first substrate as colored. Once a match has been made to within a predetermined, configurable tolerance, the synthetic reflectance curve data can then be employed to develop, update, and/or modify, for example, a colorant formula, to facilitate matching the apparent color on two different physical items with different properties.

Certain illustrative example methods, systems, computer readable media and so on are described herein in connection with the following description and the annexed drawings. These examples are indicative, however, of but a few of the various ways in which the principles of the methods, systems, computer readable media and so on may be employed and thus are intended to be inclusive of equivalents. Other advantages and novel features may become apparent from the following detailed description when considered in conjunction with the drawings.

BRIEF DESCRIPTION OF THE DRAWINGS

FIG. 10 illustrates an example method for matching colors on materials with different properties.

DETAILED DESCRIPTION

Figure 1:
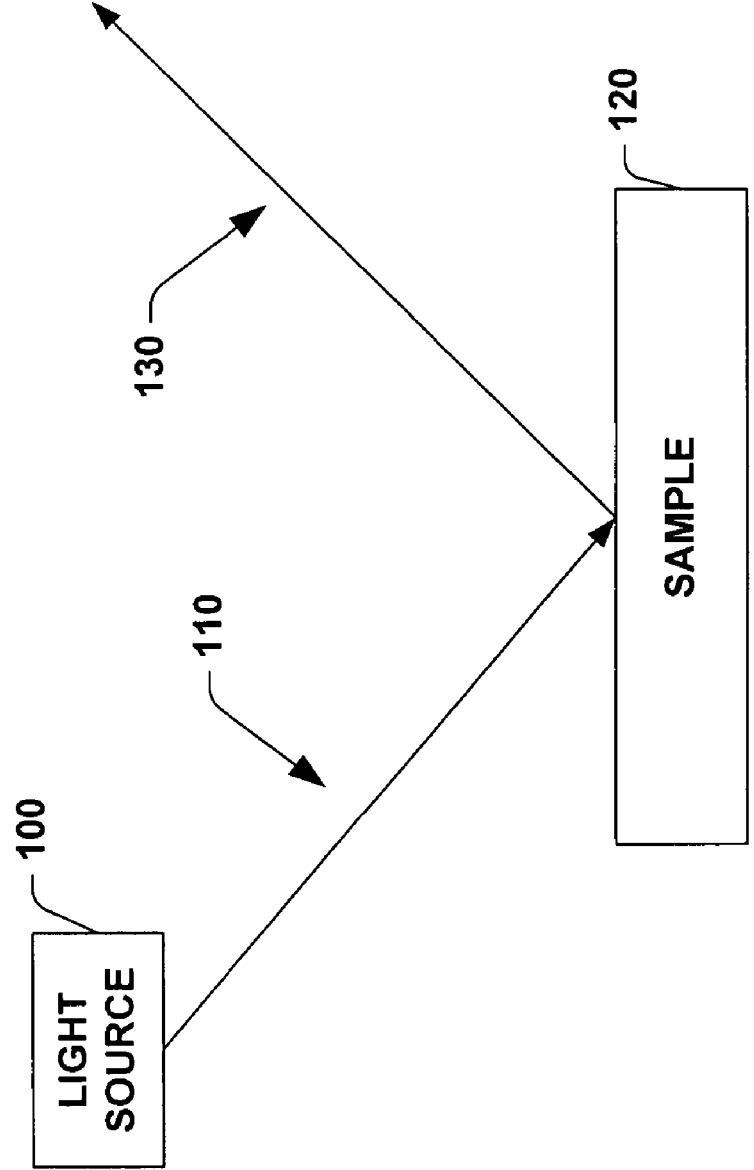
FIG. 1 illustrates specular reflection of light.

Example systems, methods, computer media, and so on are now described with reference to the drawings, where like reference numerals are used to refer to like elements throughout. In the following description for purposes of explanation, numerous specific details are set forth in order to facilitate thoroughly understanding the methods, systems and computer readable media. It may be evident, however, that the methods, systems and computer readable media can be practiced without these specific details. In other instances, well-known structures and devices are shown in block diagram form in order to simplify description.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computer components and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer, computer component, and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer/programmer or the like.

An "operable connection" (or a connection by which entities are "operably connected") is one in which signals, physical communication flow, and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Database", as used herein, refers to a collection of information organized in such a way that a computer program can quickly select desired pieces of data.

"Data store", as used herein, refers to a physical and/or logical entity that can store data. A data store may be, for example, a database, a table, a file, a list, a queue, a heap, and so on. A data store may reside in one logical and/or physical entity and/or may be distributed between two or more logical and/or physical entities.

"Display", as used herein, refers to a color rendering device that is calibrated and/or characterized. It is contemplated that a display is any form of direct-view or projected display including, for example, a cathode ray tube (CRT), liquid crystal display (LCD), organic light emitting diode (OLED), and a plasma display. Also, it is to be understood that the term display is intended to include printed reproductions.

"Colorimetric data", as used herein, refers to any quantities derived from spectrophotometric data, including the tristimulus quantities that are subsumed by more restricted definitions of calorimetric data.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor (DSP), a software controlled microprocessor, or an ASIC. Components implemented as software are not limited to any particular programming language. Rather, the description herein provides the information one skilled in the art may use to fabricate circuits or to generate computer software and/or computer components to perform the processing of the system. It will be appreciated that some or all of the functions and/or behaviors of the present system and method may be implemented as logic as defined above.

This application concerns improved, automated, repeatable methods for color matching on materials with different properties. The application describes example systems and methods for determining a predicted color match between dissimilar materials using reflectance data acquired from a "standard object". Reflectance data is acquired, in one example, as a reflectance curve from a spectrophotometer. In general, the data acquired from the spectrophotometer can be referred to as "spectrophotometric data", one example of which is a reflectance curve. A spectrophotometer is used to acquire spectrophotometric data from a physical sample that has been colored to a desired color. Then, to match the desired color on other substrates, a database of digital images of substrates is accessed. One or more digital images of substrates are electronically "colored" according to the spectrophotometric data and displayed on a computer monitor or similar display device. The coloring is performed by a computer component.

A colorimeter is employed to acquire colorimetric data associated with the display on the computer monitor or similar display device. For one or more calorimetric data sets, a compensation value is programmatically and/or electronically computed. The compensation value facilitates equalizing the color observed on one or more materials with different properties so that those materials with different properties, after being colored, will appear to be the same color as the color on the actual physical sample that has the desired color. In one example, the compensation value is used as an input to a computer component that computes a synthetic reflectance curve for the color that should be applied to a material to make it match the color on the actual sample. In one example, the resulting synthesized reflectance curve is employed to formulate a matching colorant (e.g., paint, dye, ink). While paints, dyes, and inks are associated with the term "colorant", it is to be appreciated that "colorant" is not limited to these three examples.

FIGS. 1 through 7 facilitate understanding properties of light that lead to color discrepancies between materials with different properties. FIG. 1 illustrates specular reflection. A light source 100 produces a light wave 110 that interacts with a sample 120. One possible path for the light wave 110 to take is to be reflected as light wave 130. This is specular reflection. However, not all materials will produce the same specular reflection.

Figure 2:
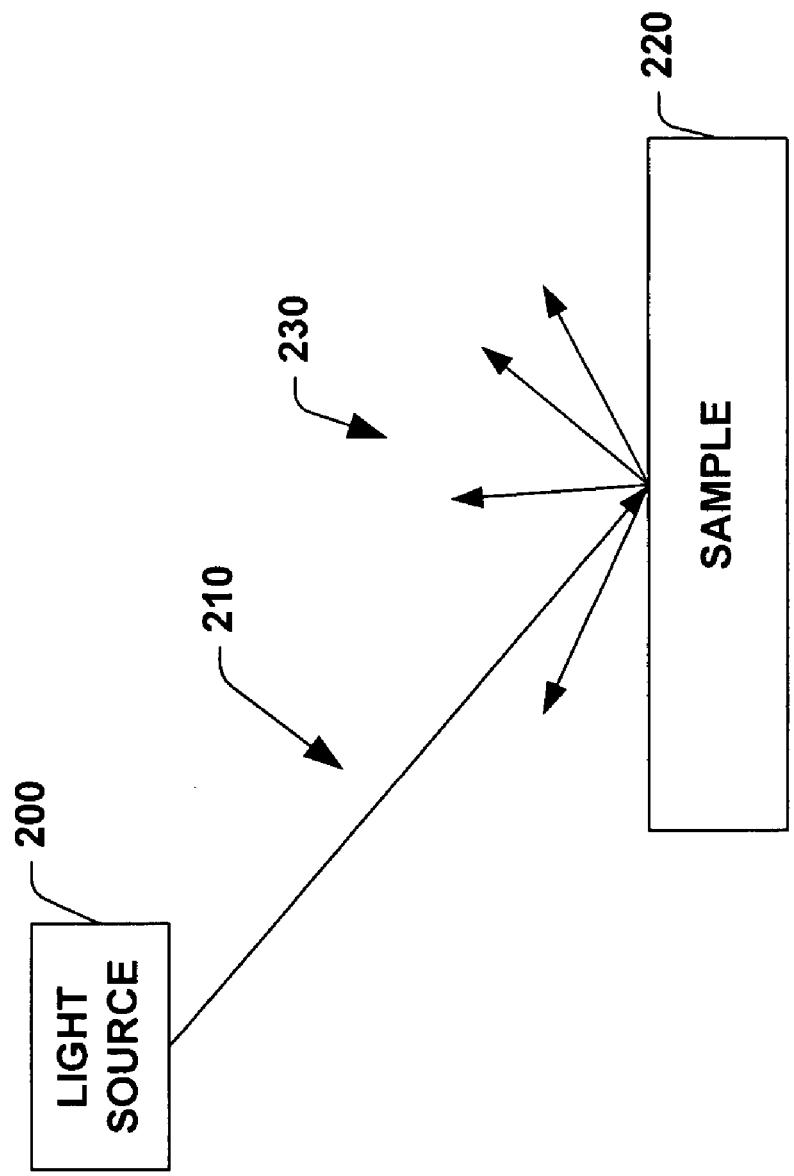
FIG. 2 illustrates diffuse reflection of light.

FIG. 2 illustrates diffuse reflection. A light source 200 produces a light wave 210 that interacts with a sample 220. Rather than being specularly reflected as in FIG. 1, the light wave 210 is diffused into several resulting light waves 230. This is diffuse reflection. Again, not all materials will produce the same diffuse reflection. The character and amount of light specularly reflected and diffusely reflected from a sample can depend, for example, on the surface properties of the sample (e.g., smoothness, roughness, texture, shininess, opacity). Not all light interacting with a sample may be reflected. Some may be transmitted by the sample.

Figure 3:
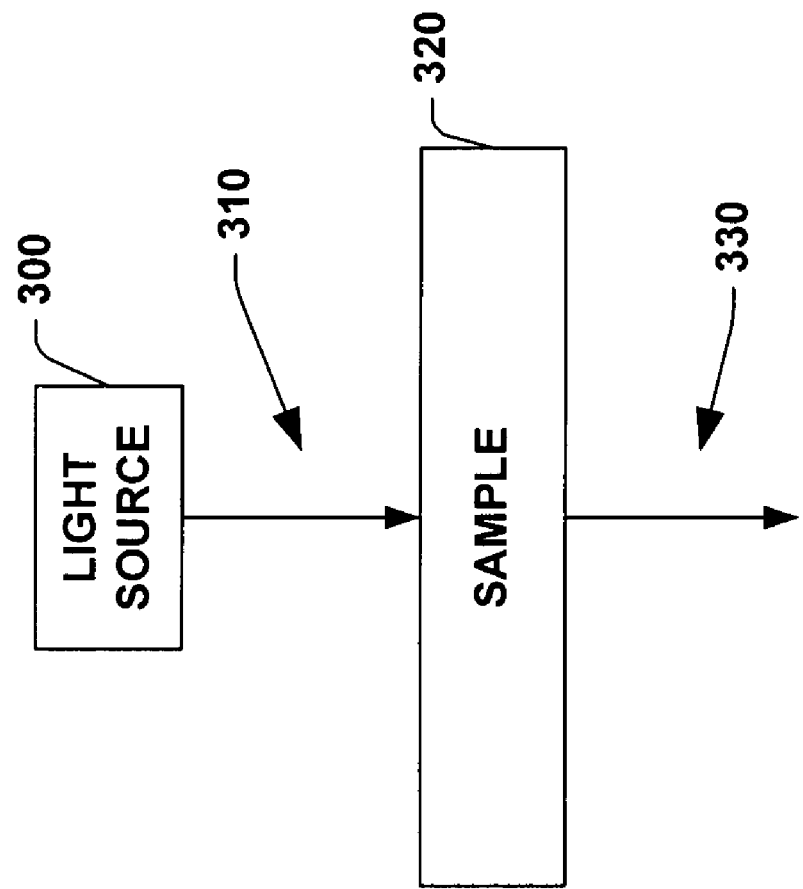
FIG. 3 illustrates regular transmission of light.

FIG. 3 illustrates regular transmission of light. A light source 300 produces a light wave 310 that interacts with a sample 320. Rather than being reflected, this light wave passes through the sample and is transmitted as light wave 330. This is regular transmission. Not all materials that transmit light will do so in the same way. Some will transmit the light after diffusing it.

Figure 4:
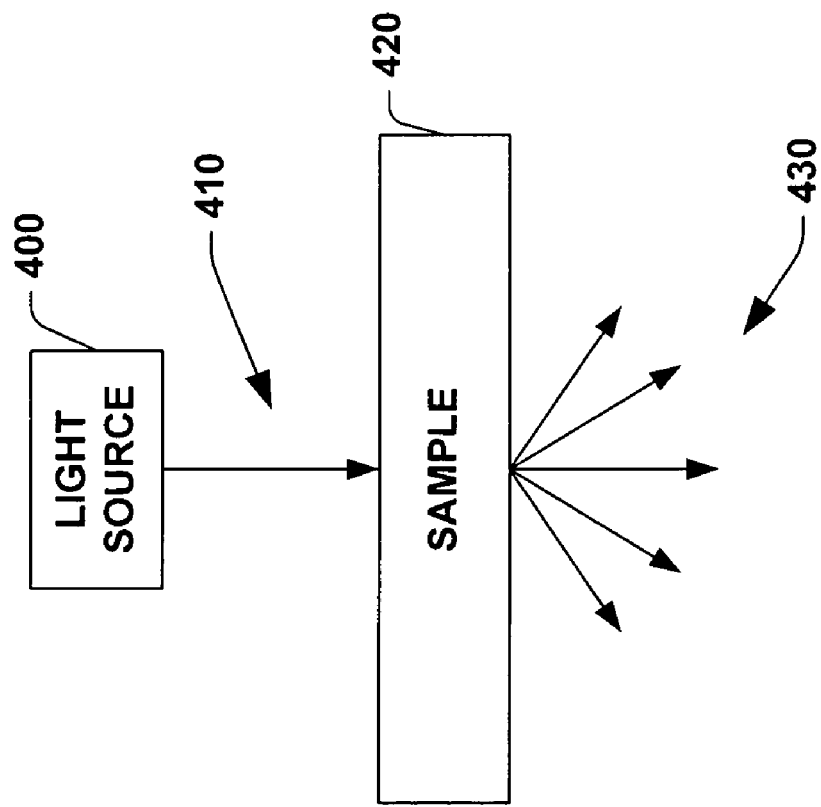
FIG. 4 illustrates diffuse transmission of light.

FIG. 4 illustrates diffuse transmission. A light source 400 produces a light wave 410 that interacts with a sample 420. Rather than a single light wave being transmitted, as illustrated in FIG. 3, multiple light waves 430 are transmitted at various angles and with various phases. Again, not all materials that transmit light will do so with the same amount and/or type of diffuse transmission. Thus, FIGS. 1 through 4 illustrate four possible results of light interacting with a sample.

Figure 5:
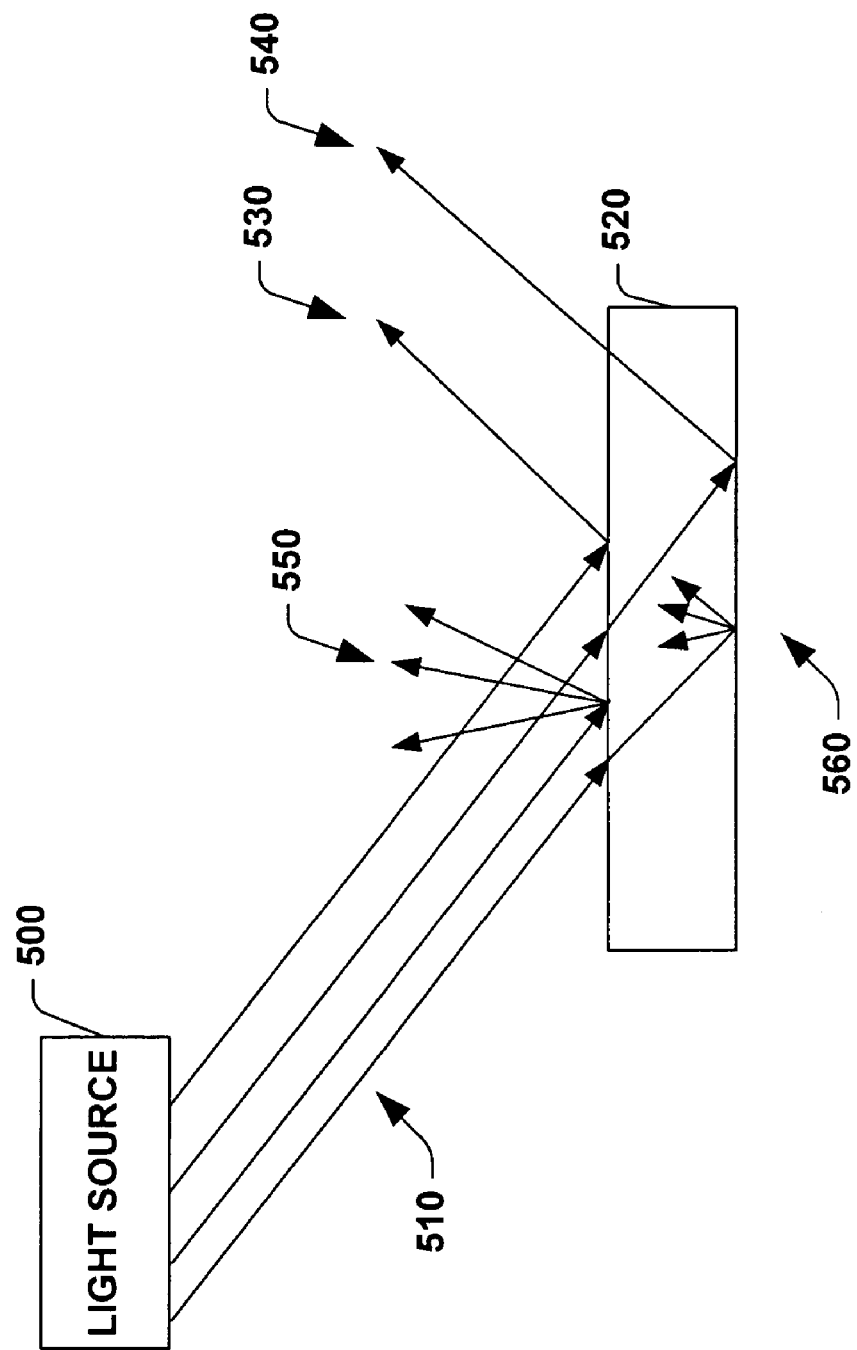
FIG. 5 illustrates specular and diffuse reflection from various surfaces of a sample.

FIG. 5 illustrates four results occurring substantially simultaneously as a result of various interactions with a sample. A light source 500 produces a set of light waves 510. A first interaction, specular reflection off the surface of the sample 520, results in a light wave 530. A second interaction, diffuse reflection off the surface of the sample 520, results in the set of waves 550. A third interaction, specular reflection with the bottom of the sample 520 results in a light wave 540. A fourth interaction, diffuse reflection off the bottom of the sample 520 results in the set of waves 560. Thus, it is to be appreciated that the light waves reflected from a sample can be due to complicated sets of interactions with light that the sample encounters. While FIG. 5 illustrates four reflections, it is to be appreciated that light could also be transmitted from the sample 520 and/or its various surfaces creating an even more complex situation. Thus, it is understandable that colors do not appear the same when applied to materials with different properties due to the varying reflection and/or transmission exhibited by materials with different properties.

Figure 6:
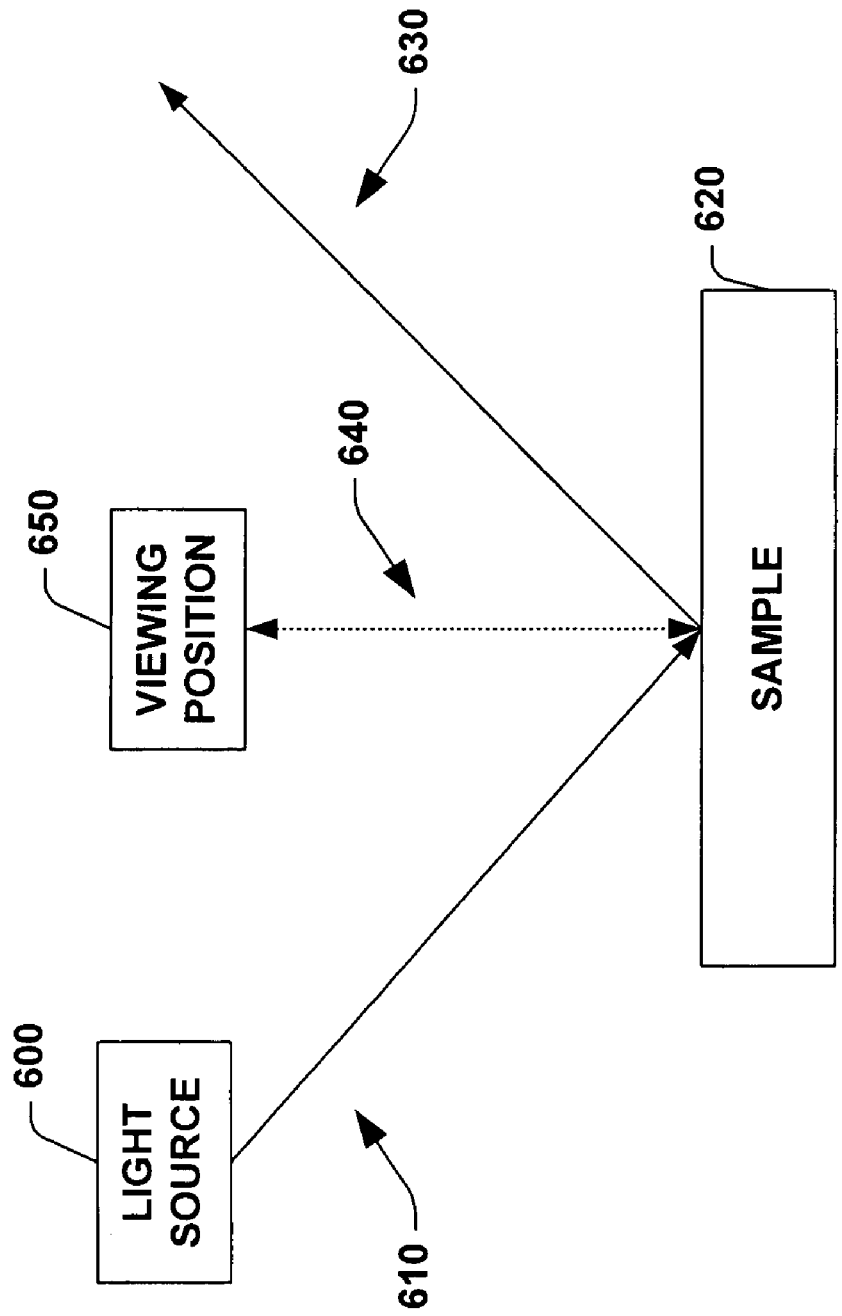
FIG. 6 illustrates color perception as affected by reflection of light from a sample with a substantially smooth surface.
Figure 7:
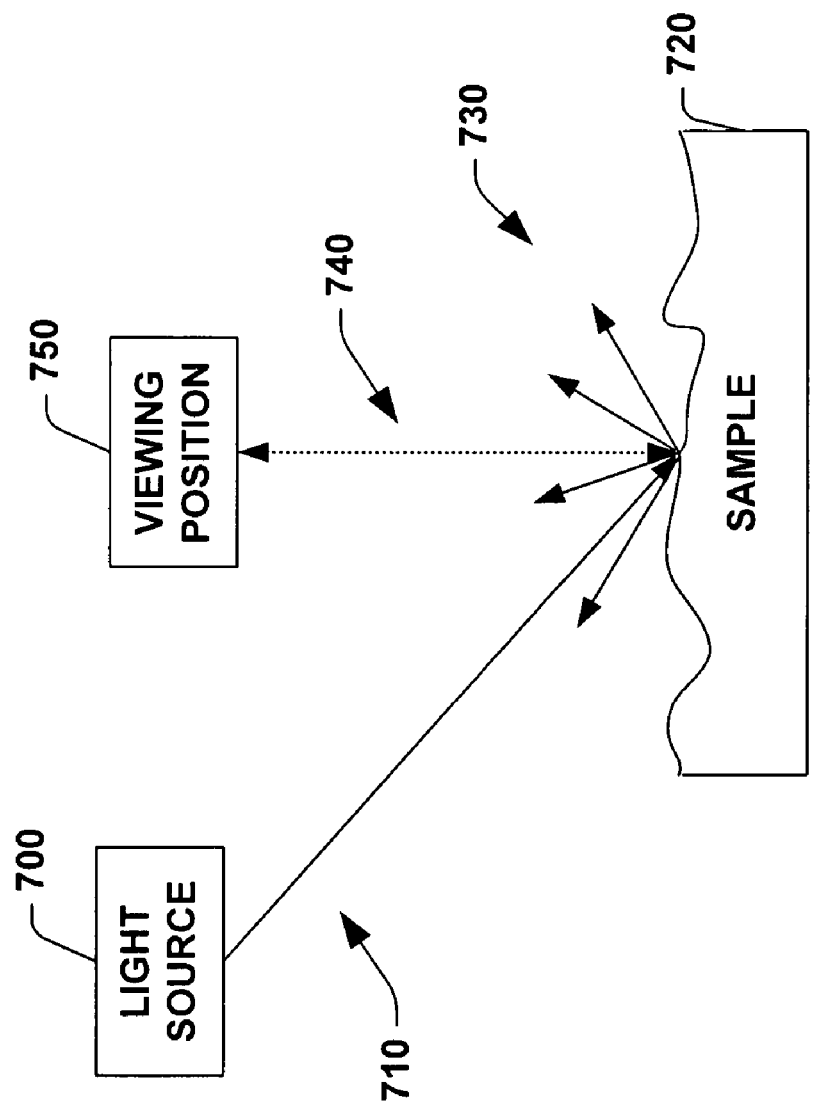
FIG. 7 illustrates color perception as affected by reflection of light from a sample with an irregular surface.

One of the properties that affects the apparent color of an object is the texture of the surface. We are all familiar with how glossy photographs appear different from matte photographs. Thus, FIGS. 6 and 7 illustrate this phenomenon, which impacts color matching on materials with different properties. FIG. 6 illustrates a light source 600 producing a light wave 610 that interacts with a sample 620 that has a substantially smooth surface. Assume that the sample 620 has been colored with a blue paint. The smoothness of the surface, and/or other properties, lead to the light wave 610 being specularly reflected as light wave 630. Thus, light waves 640 being observed at a viewing position 650 will not be influenced by the light from the light source 600, and the sample 620 will be observed to have a first color.

FIG. 7 illustrates a light source 700 producing a light wave 710 that interacts with a sample 720 that does not have a substantially smooth surface. Assume that the sample 720 has been colored with exactly the same paint employed to color sample 620. Intuitively we expect the two samples to appear to be the same color. Experience teaches us otherwise. FIG. 7 explains our experience. The texture of the surface, and/or other properties, lead to the light wave 710 being diffused into the set of light waves 730. Thus, light waves 740 being observed at a viewing position 750 will be influenced by the light from the light source 700, and the sample 720 will be observed to have a second color, different from that of FIG. 6.

Figure 8:
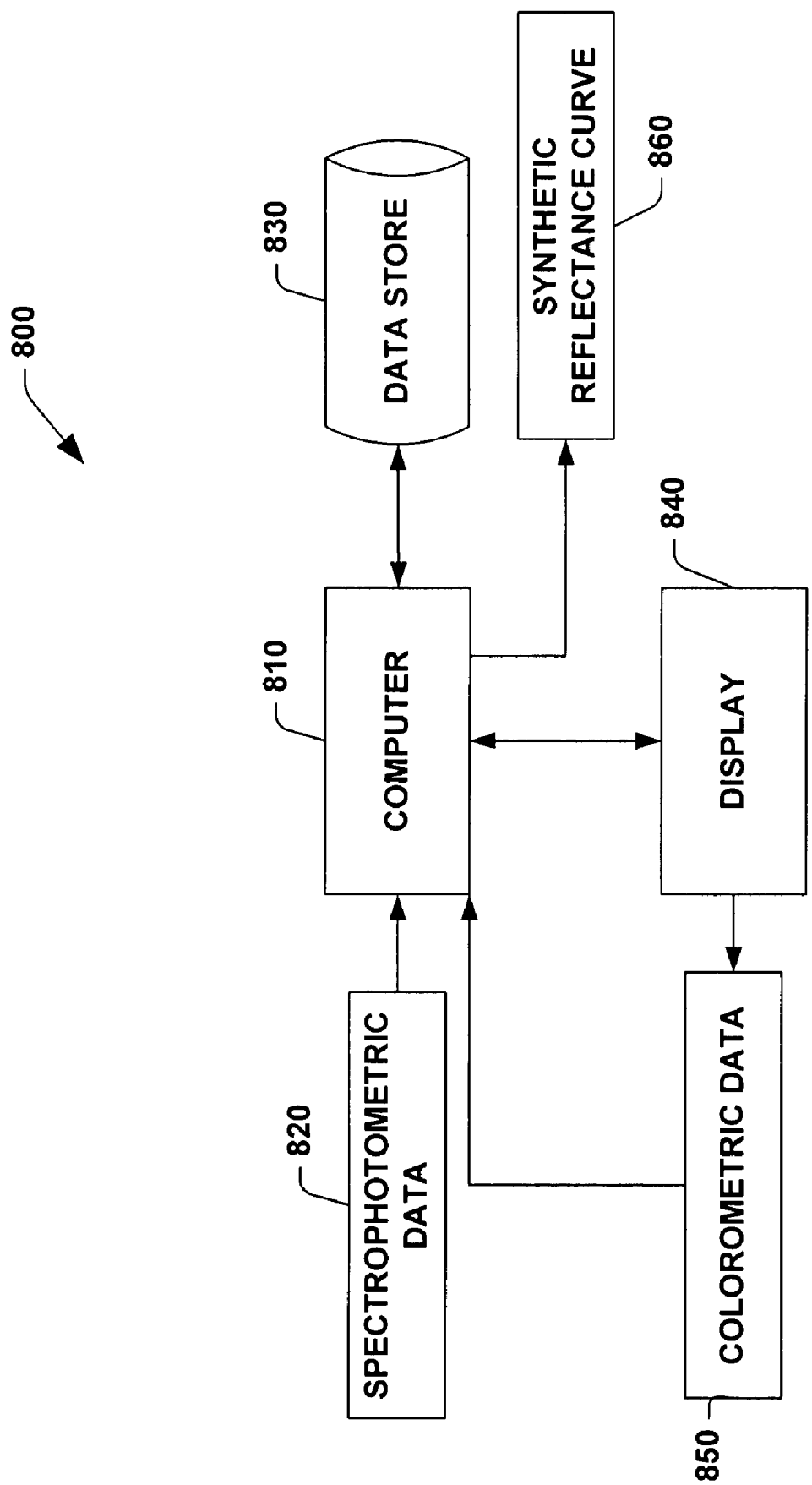
FIG. 8 illustrates an example system for matching colors on materials with different properties.

Turning now to FIG. 8, an example system 800 for matching colors on materials with different properties is illustrated. The system 800 includes a computer 810 that receives spectrophotometric data 820 from, for example, a spectrophotometer. The spectrophotometric data 820 may be acquired substantially simultaneously with performing the color matching, or it may be acquired at a point in time remote from the color matching. For example, spectrophotometric data may be acquired at a first time (e.g., June), at a first location (e.g., scanning a clothing artifact unearthed during an archeological trip to Machu Pichu) from an article of clothing made from a first fabric (e.g., llama wool). The spectrophotometric data may then be stored for later use (e.g., August) to manufacture a reproduction garment made of a second material (e.g., nylon). Thus, the computer 810 may receive the spectrophotometric data in various ways, in various formats at various times.

The spectrophotometric data 820 may be of a "reference sample" or "actual physical sample" that has been colored to a "desired color". In one example, a fabric sample is placed on a flatbed scanner and the image data 820 is acquired from the flatbed scanner. While a flatbed scanner is described, it is to be appreciated that other image capturing devices can be employed. The image data 820 is then transformed by the software into, for example, a reflectance curve. In one example, the spectral reflectance measurement of a target color on the standard substrate is obtained using a spectrophotometer. The spectral reflectance is represented by $R(\lambda)$ or $R(\lambda_i)$, i=1, 2, . . . n, where n is the total number of the wavelengths.

The computer 810 receives the spectrophotometric data generated from the image data 820 and accesses a data store 830. The data store 830 (e.g., a database), stores one or more representations (e.g., digital images) that correspond to various materials having various properties (e.g., texture, opacity, shininess). The computer 810 generates an image to display on a display 840. The image is generated by applying the spectrophotometric data to one or more of the digital images corresponding to various materials. The spectrophotometric data is applied to the digital image programmatically by the computer 810. The digital image to which the spectrophotometric data is applied can be chosen, for example, by a user interfacing with a graphical user interface. Additionally, and/or alternatively, the digital image could be programmatically selected.

As the image is displayed on the display 840, calorimetric data 850 is acquired from the display 840. For example, a device known as a CRT analyzer, (e.g., calorimeter for measuring the color output of a cathode ray tube like a television or computer monitor) acquires the colorimetric data 850. Alternative color measurement devices may be employed to acquire this data, and alternative color display devices may be employed. The data may be, for example, in the xyY value form or comparable colorimetric equation (e.g., $\Delta X = X_t - X_s$, $\Delta Y = Y_t - Y_s$, $\Delta Z = Z_t - Z_s$).

The calorimetric data 850 is fed back into the computer 810 and/or to one or more other cooperating computer components and stored for future comparison to other colorimetric data 850 acquired from other images displayed on display 840. While one computer 810 is illustrated, it is to be appreciated that the processing performed by computer 810 may be performed in one computer and/or computer component and/or could be distributed between two or more communicating, co-operating computer components.

One or more second digital images can be retrieved from the data store 830, colored with the spectrophotometric data 820 and displayed on the display 840. Thus, one or more second sets of calorimetric data 850 can be acquired from the display 840 and fed back to the computer 810 and/or distributed to one or more other computer components.

After two or more sets of colorimetric data 850 have been collected, the computer 810, and/or one or more other cooperating computer components can compute a synthetic reflectance curve 860 that describes the color that needs to be displayed on a second material to make that second material appear the same color as an object of a first material that has been colored to the desired color. In one example, a compensation value is computed by the computer 810 to facilitate matching the colors, and from the compensation value the synthetic reflectance curve 860 is generated.

Figure 9:
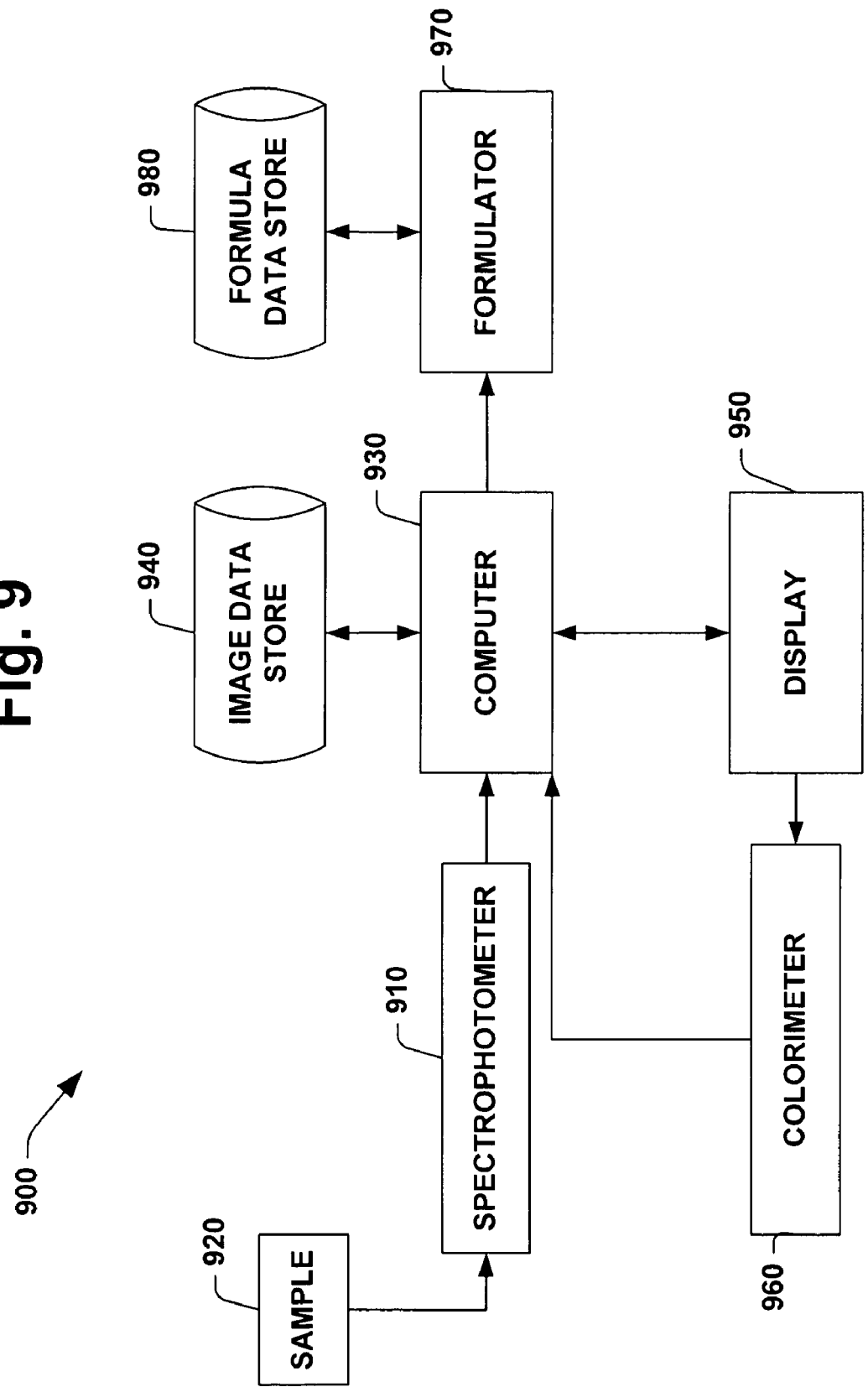
FIG. 9 illustrates an example system for matching colors on materials with different properties.

FIG. 9 illustrates an example system 900 for matching colors on materials with different properties. The system 900 includes a computer 930. The computer 930 receives spectrophotometric data from a spectrophotometer 910. The spectrophotometer 910 acquires spectrophotometric data (e.g., a reflectance curve) that characterizes a sample 920 that has been colored to a desired color. This configuration may be found, for example, in industrial settings (e.g., textile plant, paint factory, plastics factory) and/or other settings.

The computer 930 receives the spectrophotometric data and accesses an image data store 940. The image data store 940 stores one or more digital images that correspond to various materials having various properties (e.g., textures, opacity, shininess). For example, digital representations of various cottons with various weaves, thread counts, and thread sizes may be stored. The computer 930 generates an image to display on a display 950. The image is generated by applying the spectrophotometric data acquired from the spectrophotometer 910 to one or more of the digital images. The digital image to which the spectrophotometric data is applied can be chosen, for example, by a user interfacing with a graphical user interface. Additionally, and/or alternatively, the digital image could be programmatically selected. Furthermore, the digital image could be selected by a fabric analyzer (not illustrated) that analyzes a piece of fabric and determines which stored digital image corresponds to the analyzed fabric.

As the image is displayed on the display 950, colorimetric data is acquired from the display 950 by a colorimeter 960. The calorimeter 960 feeds back the calorimetric data to the computer 930 and/or to one or more other cooperating computer components where it is stored for future comparison to other colorimetric data acquired from other images displayed on display 950 and/or other related displays. While one computer 930 is illustrated, it is to be appreciated that the processing performed by computer 930 may be performed in one computer and/or computer component and/or could be distributed between two or more communicating, co-operating computer components. Furthermore, while one spectrophotometer 910 and one colorimeter 960 are illustrated, it is to be appreciated that computer 930 could receive inputs from one or more of each of the illustrated devices. Similarly, while one display 950 is illustrated, images could be displayed on two or more displays and colorimetric data acquired from those displays.

One or more second digital images can be retrieved from the image data store 940, colored with the spectrophotometric data and displayed on the display 950. Thus, one or more second sets of colorimetric data can be acquired from the display 950 by the colorimeter 960 and fed back to the computer 930 and/or distributed to one or more other computer components.

After two or more sets of colorimetric data have been collected, the computer 930, and/or one or more other cooperating computer components can compute a synthetic reflectance curve that describes the color that needs to be displayed on a second material to make that second material appear the same color as an object comprised of a first material that has been colored to the desired color. In one example, a compensation value is computed, and from the compensation value the synthetic reflectance curve is generated.

In one example, the system 900 also includes a formula data store 980 and a formulator 970. The formulator 970 accepts the compensation value and/or the synthetic reflectance curve and computes a formula for a colorant that can be applied to a second material with second properties to make it appear the same color as the sample 920, which was of a first material with first properties.

Figure 11:
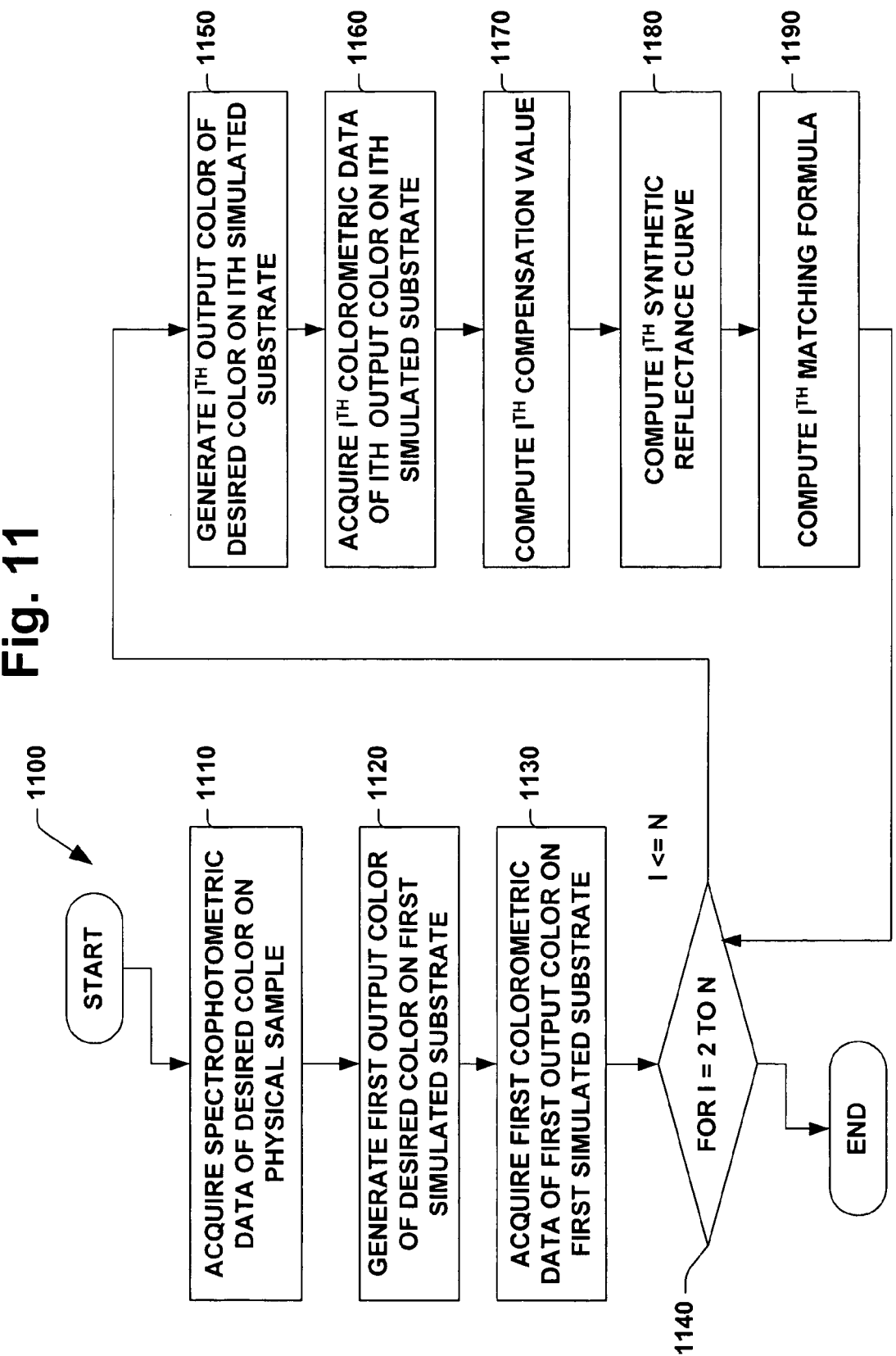
FIG. 11 illustrates an example method for matching colors on materials with different properties.

In view of the exemplary systems shown and described herein, example methodologies that are implemented will be better appreciated with reference to the flow diagrams of FIGS. 10 and 11. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, methodologies are implemented as computer executable instructions and/or operations, stored on computer readable media including, but not limited to an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an ASIC, and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, initialization of loops and variables, routine loops, and so on are not shown. Furthermore, while some steps are shown occurring serially, it is to be appreciated that some illustrated steps may occur substantially in parallel.

FIG. 10 illustrates a method 1000 for matching colors on materials with different properties. At 1010, the method includes acquiring spectrophotometric data. The data may be received, for example, from a physical sample that has been colored to a desired color. Additionally, and/or alternatively, the data may be received from a computer component and/or a data store. In one example, the spectral reflectance measurement of a target color on the standard substrate is obtained using a spectrophotometer. The spectral reflectance is represented by $R(\lambda)$ or $R(\lambda_i)$, $i=1,2,\ldots,n$ where n is the total number of the wavelengths.

At 1020, the method includes acquiring a digital image of a substrate. The digital image may be stored, for example, in a substrate data store (e.g., database). The substrate may be, for example, a computer image of a fabric, a plastic, a plaster, a wood, a rubber, and so on. The computer image may be, for example, acquired from a scanner, produced programmatically by a programmer, produced graphically by an artist, and so on. The digital image has a form that facilitates "coloring" the image with spectrophotometric data. In one example, The image of the standard substrate is obtained using an image-capture device. The RGB value on each pixel of the image is represented by $$\{R_{s0}, G_{s0}, B_{s0}\}_i, i=1,2,\ldots,M;$$

where M is the total number of pixels in the image.

Thus, at 1030, an image is generated from the spectrophotometric data and the digital image. In one example, the image is displayed substantially simultaneously as it is generated. In another example, the image is stored for subsequent display.

At 1040, first calorimetric data is acquired from the image display. For example, the image may be displayed on a computer monitor with which a colorimeter has been associated. Thus, the colorimeter can analyze the displayed image, produce calorimetric data and supply it to the method.

At 1050, another digital image of another substrate is acquired. This digital image will likely correspond to a target material that the user would like to have appear as the same color as the reference sample from which the spectrophotometric data was acquired. In one example, the image of the target substrate is also obtained using an image-capture device. The RGB value on each pixel of this image is represented by $$\{R_{t0}, G_{t0}, B_{t0}\}_i, i=1, 2,\ldots, N.$$

The N may or may not be equal to M.

At 1060, a second image is generated by applying the spectrophotometric data to the digital image. Again, the second image may be displayed substantially as soon as it is generated and/or it may be stored for subsequent display and analysis.

At 1070, second colorimetric data is acquired from the display of the second image. Now the method 1100 has two or more sets of calorimetric data associated with displayed images. One set of calorimetric data is associated with the computer display of a reference sample that has been colored to a desired color. One or more other sets of colorimetric data are associated with computer displays of simulated samples that have been colored according to spectrophotometric data retrieved from the reference sample. Thus, at 1080, the first colorimetric data and the second colorimetric data(s) are compared to determine what differences, if any, exist between the displays. In one example, the method calculates the image of the target color on the standard substrate. For example, the RGB value of image pixels is calculated as:

$$\{R_s, G_s, B_s\}_i = f(\{R_{s0}, G_{s0}, B_{s0}\}_i, R(\lambda)) \text{ For } i=1,2,\ldots, M$$

where the function $f$ represents an algorithm. The algorithm includes using the calibration profile of the displaying device.

Using the calculated $\{R_s, G_s, B_s\}_i$, i=1,2, ..., M, the image of the target color on the standard substrate is displayed on the calibrated device. Using the same algorithm, the image of the target color on the target substrate is calculated.

$$\{R_t, G_t, B_t\}_i = f(\{R_{t0}, G_{t0}, B_{t0}\}_i, R(\lambda)), \text{ For } i=1,2,\ldots, N.$$

The calculated image $\{R_t, G_t, B_t\}_i$, i=1, 2, ..., M is also displayed on the calibrated device. Measuring the two images on the display screen using a colorimeter, the colorimetric data from both the images are obtained. Assuming the obtained data are the tristimulus values, the measurement of the color on the standard and the target substrates are represented by $\{X_s, Y_s, Z_S\}$ and $\{X_t, Y_t, Z_t\}$ respectively.

At 1090, based on the differences, a synthetic reflectance curve is generated. This synthetic reflectance curve facilitates producing a color that when applied to the second simulated substrate will make its display appear substantially similar to the color of the first image. Thus, matching colors on materials with different properties is automated, made more accurate and more repeatable.

In one example, method 1000 continues to 1099, where a formula for a colorant is produced. The formula may be, for example, for an ink, a dye, a paint, and so on. The formula can be produced by using the synthetic reflectance curve of 1090. In one example, the method calculates the differences between the tristimulus values using, for example:

$$\Delta X = X_t - X_s, \Delta Y = Y_t - Y_s, \Delta Z = Z_t - Z_s.$$

The method then calculates the change in the spectral reflectance, $R(\lambda)$, of the target color if the substrate is switched from the standard substrate to the target substrate using, for example:

$$\Delta R(\lambda) = g(R(\lambda), \Delta X, \Delta Y, \Delta Z);$$

where the function g represents an algorithm. This algorithm may also use the calibration profile of the displaying device. The method can then calculate the adjusted spectral reflectance for the target color on the target substrate using, for example:

$$R'(\lambda_i) = R(\lambda_i) + \Delta R(\lambda_i); i=1,2,\ldots, n.$$

Turning now to FIG. 11, another example method 1100 for matching colors on materials with different properties is illustrated. At 1110, the method acquires spectrophotometric data of a desired color on a physical sample. For example, a piece of cloth could be placed on a flatbed scanner and an image data acquired from which a reflectance curve can be generated. At 1120, the method includes generating a first output color. The first output color is generated by applying the spectrophotometric data to a first simulated substrate. For example, a digital image could be retrieved from a database of digital images of substrates and colored according to the spectrophotometric data.

At 1130, colorimetric data associated with the first output color is acquired. For example, if the first output color was displayed on a computer monitor, then a calorimeter could analyze the computer monitor display and acquire calorimetric data of the displayed color. With the spectrophotometric data and colorimetric data for the "reference sample"

acquired, the method 1100 then enters a loop. In the loop, one or more additional colors are generated, displayed, and analyzed to acquire calorimetric data. For each of the additional colors that are generated, displayed, and analyzed, a synthetic reflectance curve is generated. The synthetic reflectance curve facilitates producing a color that when applied to a simulated substrate will make that simulated substrate appear to have the same color as the reference sample and/or that facilitates resolving differences in apparent colors. In one example, the synthetic reflectance curve is employed to generate a formula for a colorant that can be applied to an actual substrate to make it appear to match the reference sample.

At 1140, a determination is made whether all N, N being an integer, desired substrates have been analyzed. If the determination is yes, then processing can conclude. Otherwise processing continues at 1150.

At 1150, another output color is generated by applying the spectrophotometric data to another simulated substrate. The output color can then be displayed. Thus, at 1160, colorimetric data associated with the output color can be acquired. For example, a calorimeter can acquire data from a computer monitor displaying the output color. In one example, at 1170, a compensation value is generated that facilitates, at 1180, computing a synthetic reflectance curve for a color that facilitates matching colors on materials with different properties. Though a compensation value is computed at 1170, it is to be appreciated that other values and/or formulae can be applied to facilitate producing the synthetic reflectance curve at 1180. In one example, at 1190, a matching formula is computed. The formula can be computed to facilitate having the apparent colors of different materials appear the same. The matching formula may be based on the synthetic reflectance curve of 1180 and/or the compensation value of 1170.

Figure 12:
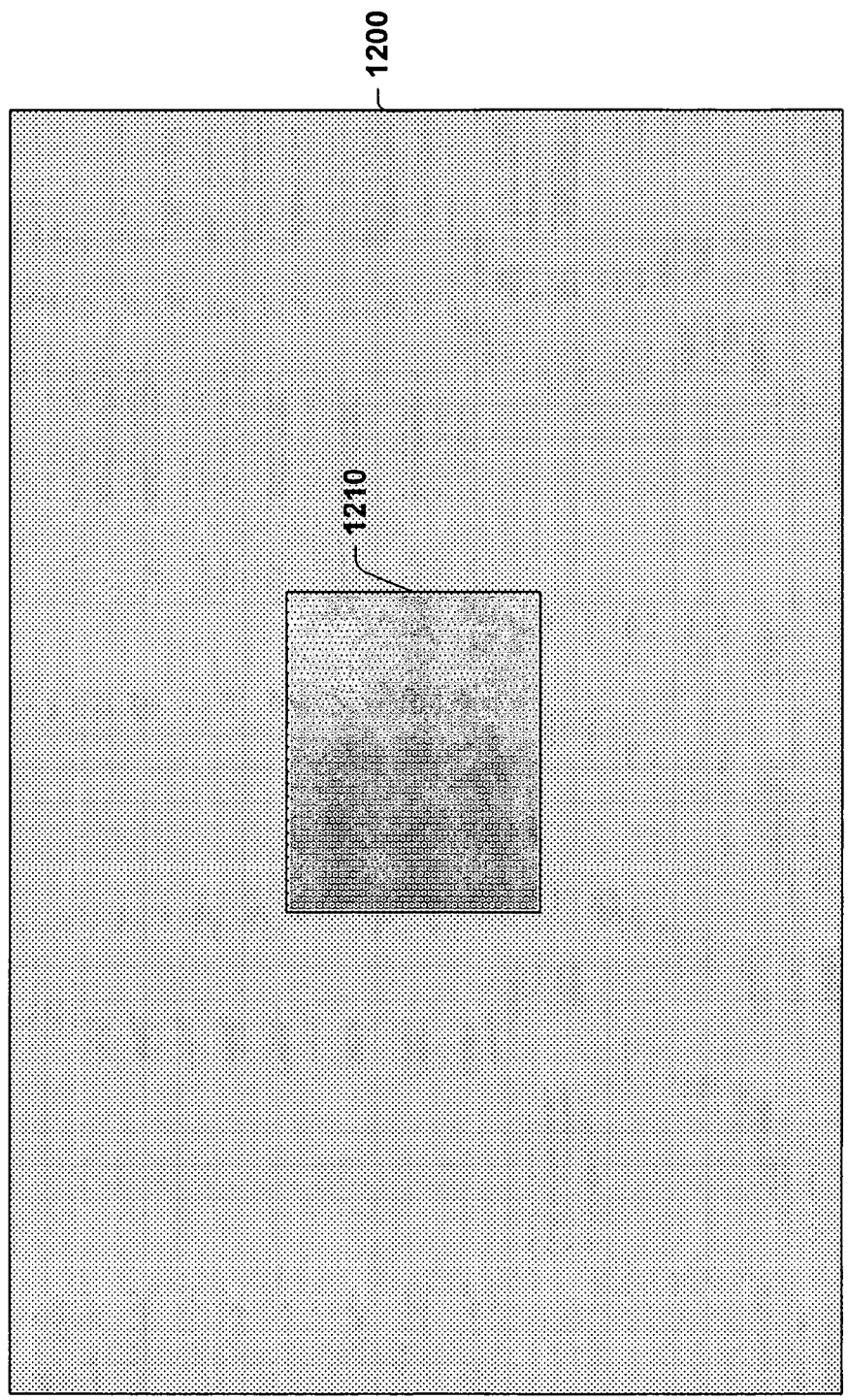
FIG. 12 illustrates an example screen shot from a program for matching colors on materials with different properties.
Figure 13:
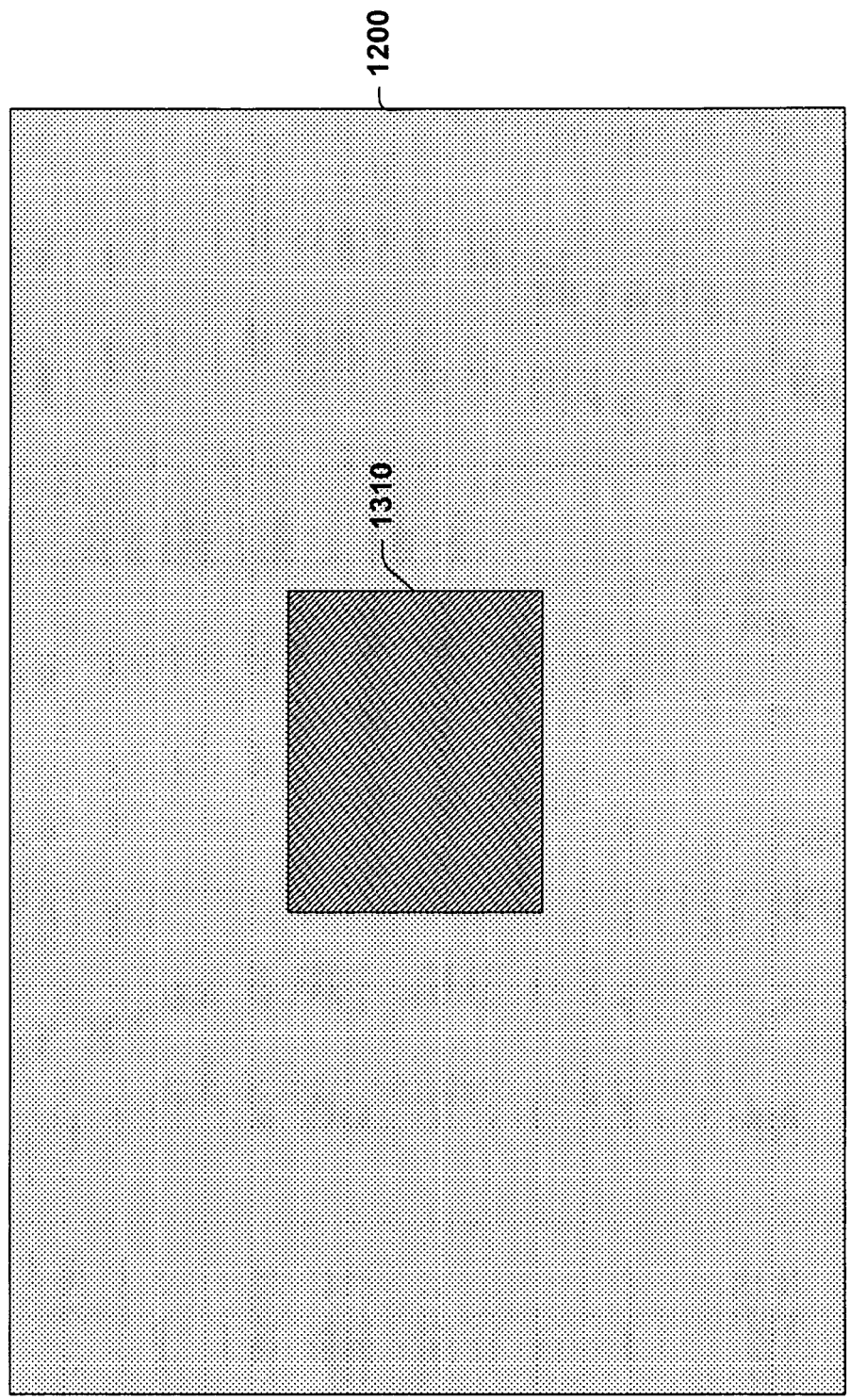
FIG. 13 illustrates an example screen shot from a program for matching colors on materials with different properties.
Figure 14:
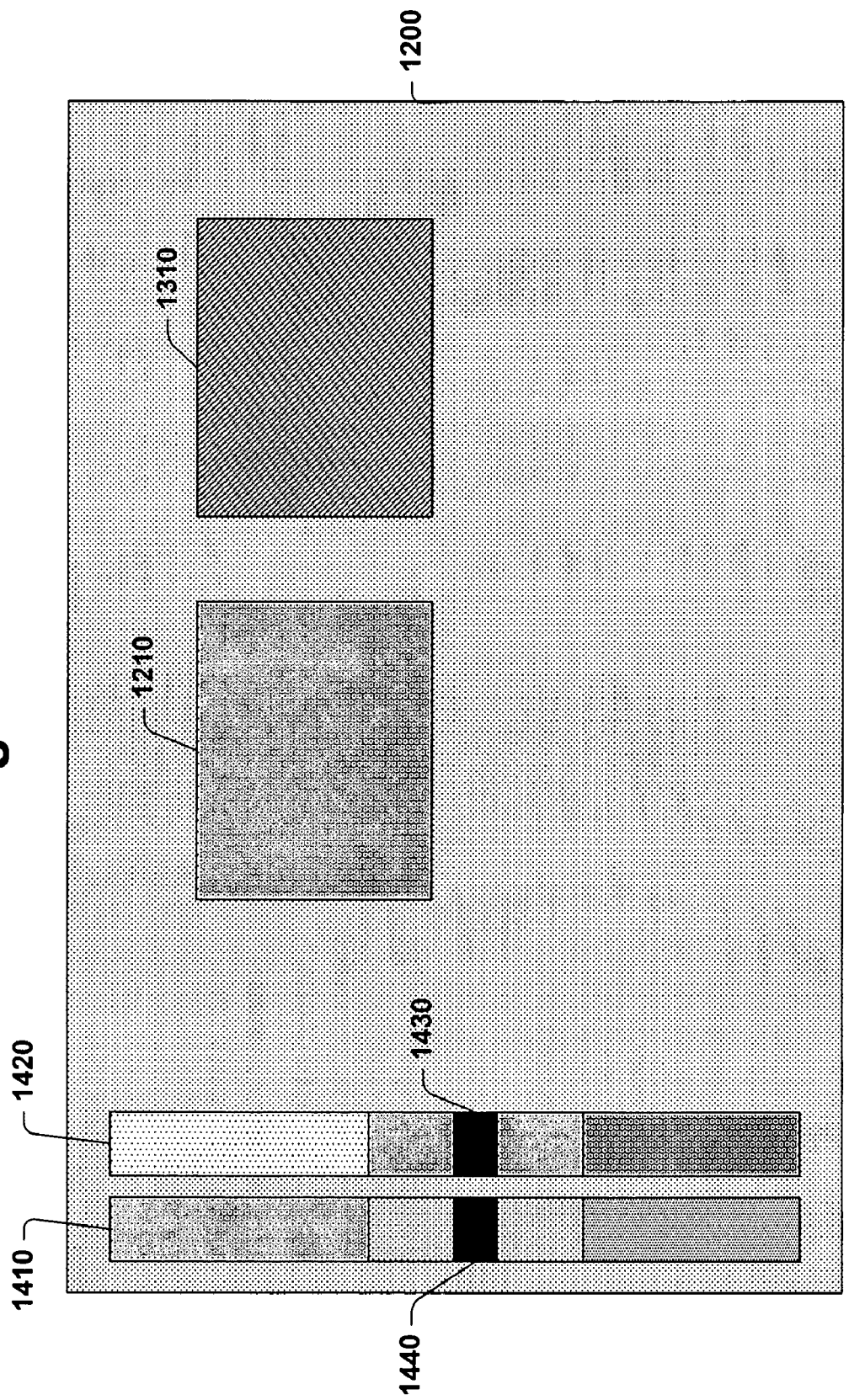
FIG. 14 illustrates an example screen shot from a program for matching colors on materials with different properties.

FIG. 12 illustrates an example screen shot from a program for matching colors on materials with different properties. A computer display 1200 includes a segment 1210 that displays a color generated by applying spectrophotometric data acquired from a reference sample to a first simulated substrate. Similarly, FIG. 13 illustrates an example screen shot from a program for matching colors on materials with different properties. The computer display 1200 includes a segment 1310 that displays a second color generated by applying spectrophotometric data acquired from the reference sample to a second simulated substrate. FIG. 14 illustrates an example screen shot from a program for matching colors on materials with different properties. In FIG. 14, the computer display 1200 displays segments 1210 and 1310 side by each, and also includes a number of graphical user interface controls. For example, a graphical user interface control 1410, which includes a setting slider bar 1440, may be employed to manually and/or programmatically alter the hue in one or more of the displayed segments. Similarly, a graphical user interface control 1420, which includes a setting slider bar 1430 may be employed to manually and/or programmatically alter the brightness in one or more of the displayed segments. Thus, a graphical user interface can be employed to present choices concerning matters including, but not limited to, substrates to color, color intensity, hue, brightness, saturation, texture and so on associated with colors to be matched on different materials. While controls with slideable setting bars are illustrated it is to be appreciated that various other controls known in the art may also be employed with the graphical user interface.

Figure 15:
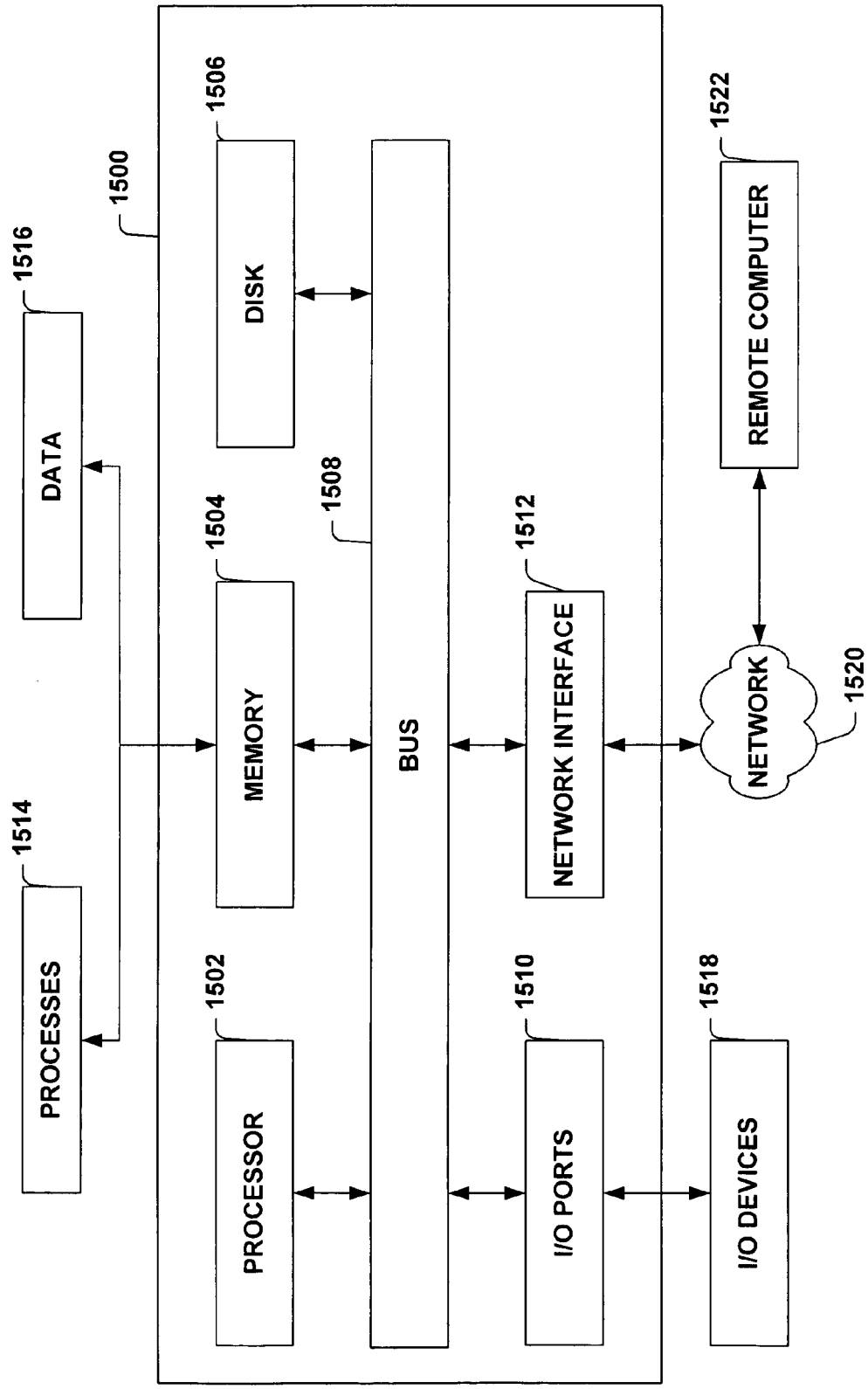
FIG. 15 is a schematic block diagram of an example computing environment on which the example methods can be implemented.

FIG. 15 illustrates a computer 1500 that includes a processor 1502, a memory 1504, a disk 1506, input/output ports 1510, and a network interface 1512 operably connected by a bus 1508. Executable components of the systems described herein may be located on a computer like computer 1500. Similarly, computer executable methods described herein may be performed on a computer like computer 1500. It is to be appreciated that other computers may also be employed with the systems and methods described herein. The processor 1502 can be a variety of various processors including dual microprocessor and other multi-processor architectures. The memory 1504 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 1506 can include, but is not limited to, devices like a magnetic disk drive, a floppy disk drive, a tape drive, a Zip drive, a flash memory card, and/or a memory stick. Furthermore, the disk 1506 can include optical drives like, compact disk ROM (CD-ROM), a CD recordable drive (CD-R drive), a CD rewriteable drive (CD-RW drive) and/or a digital versatile ROM drive (DVD ROM). The memory 1504 can store processes 1514 and/or data 1516, for example. The disk 1506 and/or memory 1504 can store an operating system that controls and allocates resources of the computer 1500.

The bus 1508 can be a single internal bus interconnect architecture and/or other bus architectures. The bus 1508 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1500 interacts with input/output devices 1518 via input/output ports 1510. Input/output devices 1518 can include, but are not limited to, a scanner, a spectrophotometer, a calorimeter, a keyboard, a microphone, a pointing and selection device, cameras, video cards, displays, and the like. The input/output ports 1510 can include but are not limited to, serial ports, parallel ports, and USB ports.

The computer 1500 can operate in a network environment and thus is connected to a network 1520 by a network interface 1512. Through the network 1520, the computer 1500 may be logically connected to a remote computer 1522. The network 1520 can include, but is not limited to, local area networks (LAN), wide area networks (WAN), and other networks. The network interface 1512 can connect to local area network technologies including, but not limited to, fiber distributed data interface (FDDI), copper distributed data interface (CDDI), ethernet/IEEE 802.3, token ring/IEEE 802.5, and the like. Similarly, the network interface 1512 can connect to wide area network technologies including, but not limited to, point to point links, circuit switching networks like integrated services digital networks (ISDN), packet switching networks, and digital subscriber lines (DSL). Since the computer 1500 can be connected with other computers, and since the systems and methods described herein may include distributed communicating and cooperating computer components, information may be transmitted between these components.

Figure 16:
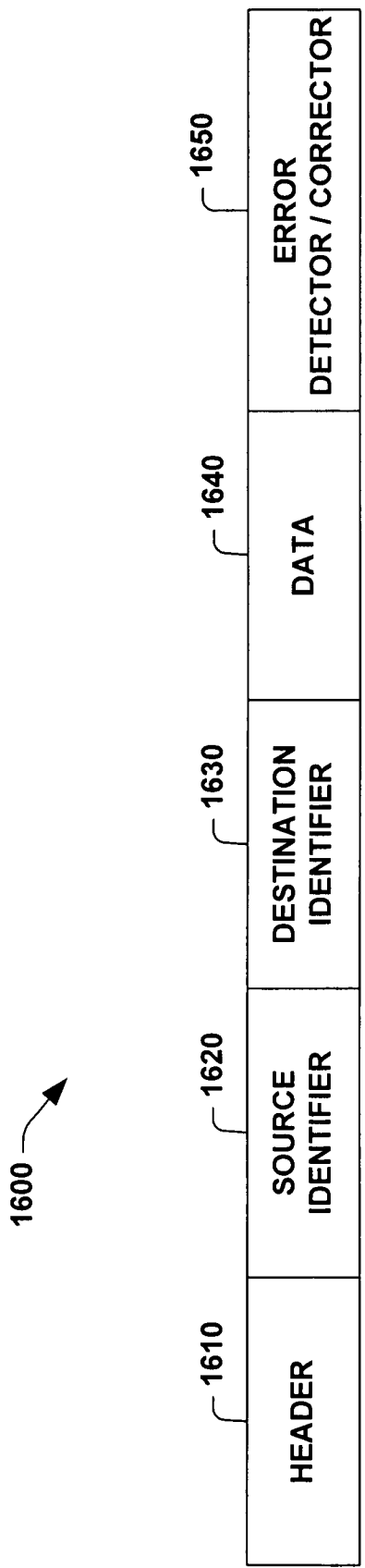
FIG. 16 illustrates an example data packet for communicating information between computer components involved in matching colors on materials with different properties.

Thus, referring now to FIG. 16, information can be transmitted between various computer components associated with matching colors on materials with different properties described herein via a data packet 1600. An exemplary data packet 1600 is shown. The data packet 1600 includes a header field 1610 that includes information like the length and type of packet. A source identifier 1620 follows the header field 1610 and includes, for example, an address of the computer component from which the packet 1600 originated. Following the source identifier 1620, the packet 1600 includes a destination identifier 1630 that holds, for example, an address of the computer component to which the packet 1600 is ultimately destined. Source and destination identifiers can be, for example, globally unique identifiers (guids), URLS (uniform resource locators), path names, and the like. The data field 1640 in the packet 1600 includes various information intended for the receiving computer component. The data packet 1600 ends with an error detecting and/or correcting field 1650 that facilitates a computer component determining if it has properly received the packet 1600. While six fields are illustrated in the data packet 1600, it is to be appreciated that a greater and/or lesser number of fields can be present in data packets.

Figure 17:
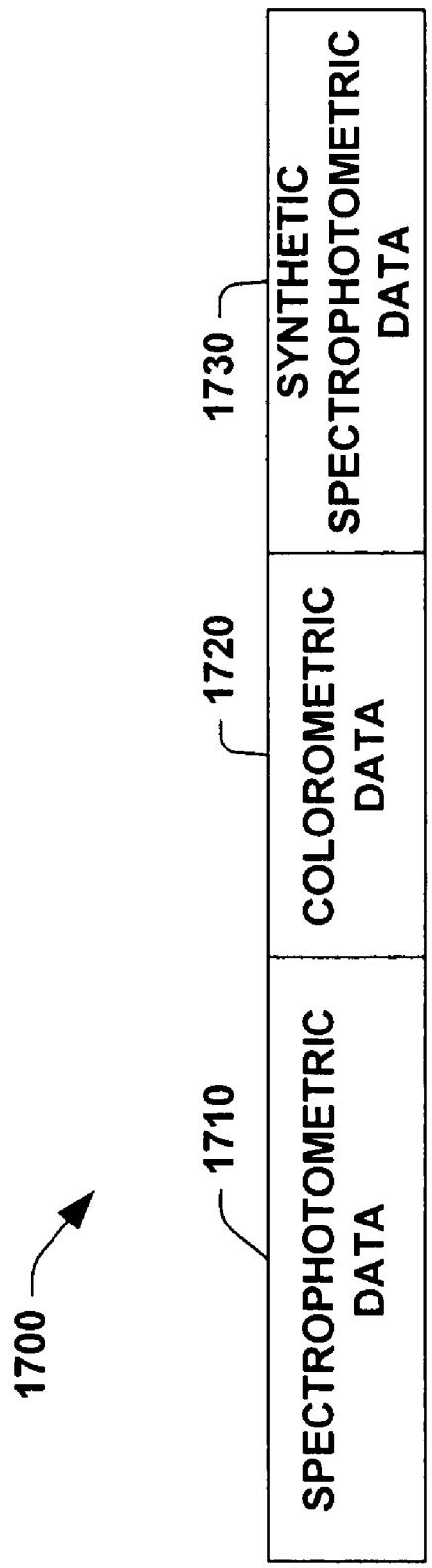
FIG. 17 illustrates example data packet subfields for communicating information between computer components involved in matching colors on materials with different properties.

FIG. 17 is a schematic illustration of sub-fields 1700 within the data field 1640 (FIG. 16). The sub-fields 1700 discussed are merely exemplary and it is to be appreciated that a greater and/or lesser number of sub-fields could be employed with various types of data germane to matching colors on materials with different properties. The sub-fields 1700 include a field 1710 that holds, for example, spectrophotometric data. The spectrophotometric data may have been acquired, for example, by scanning a reference sample that had been colored to a desired color to acquire an image data and then processing the image data into spectrophotometric data. The spectrophotometric data may take the form of a reflectance curve, for example.

The sub-fields 1700 may also include a field 1720 that holds calorimetric data. The calorimetric data may have been acquired, for example, by using a calorimeter to analyze a color displayed on a computer monitor or other display device. By way of illustration, a color may have been generated by applying the spectrophotometric data stored in field 1710 to a digital image of a simulated substrate. The color may then have been displayed on a computer monitor and a colorimeter employed to analyze that color and produce the calorimetric data stored in field 1720. While a single calorimetric field 1720 is illustrated, it is to be appreciated that a greater number of colorimetric data fields 1720 may be included in the sub-fields 1700.

As a result of analyzing one or more sets of colorimetric data, a synthetic spectrophotometric data may be generated. Thus, the sub-fields 1700 may include a field 1730 for storing spectrophotometric data. While a single field 1730 is illustrated, it is to be appreciated that there may be two or more such fields. For example, there may be a field 1730 for storing a synthetic spectrophotometric data for each of a corresponding colorimetric data stored in a field 1720.

Figure 18:
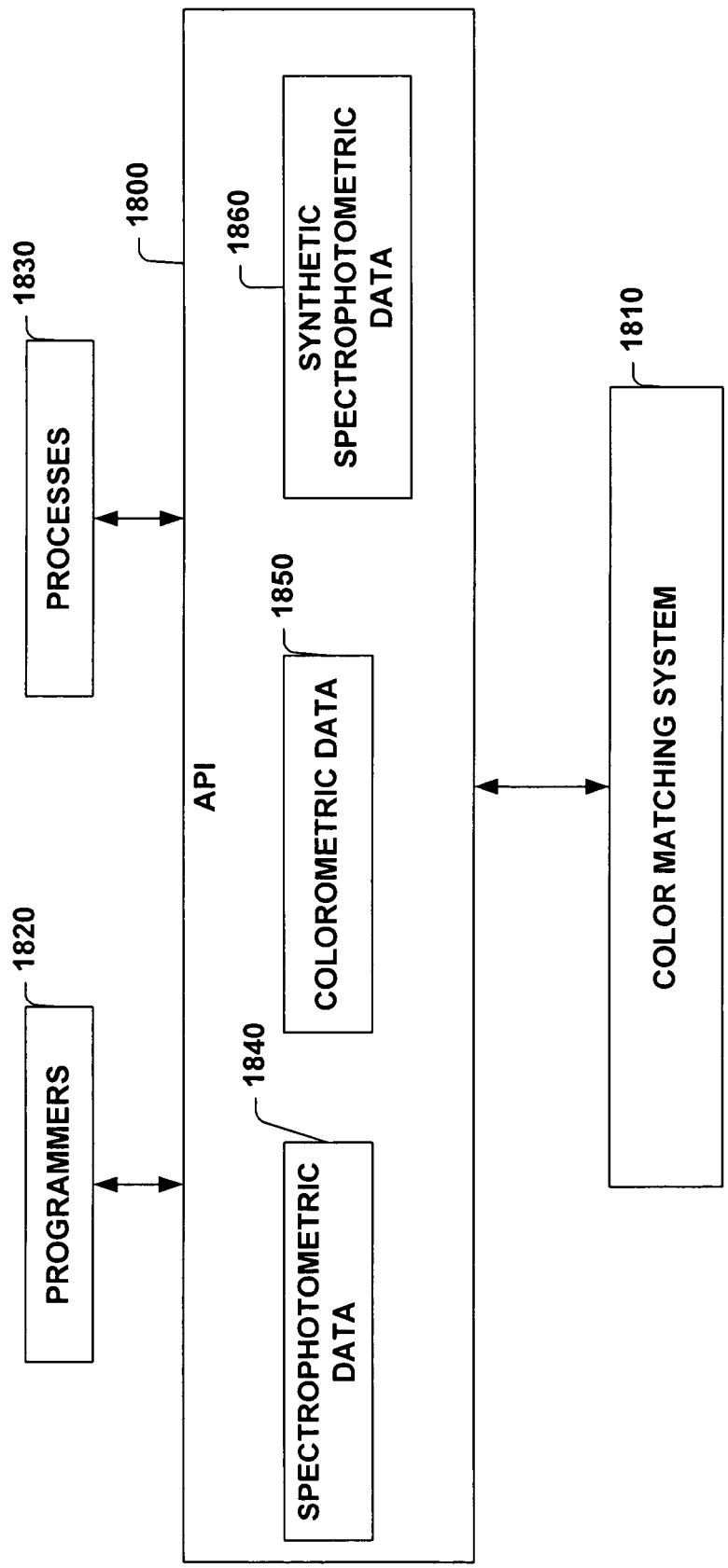
FIG. 18 illustrates an example application programming interface employed to facilitate communications with a color matching system.

Referring now to FIG. 18, an application programming interface (API) 1800 is illustrated providing access to a system 1810 for matching colors on materials with different properties. The API 1800 can be employed, for example, by programmers 1820 and/or processes 1830 to gain access to processing performed by the system 1810. For example, a programmer 1820 can write a program to access the system 1810 (e.g., to invoke its operation, to monitor its operation, to access its functionality) where writing a program is facilitated by the presence of the API 1800. Thus, rather than a programmer 1820 having to understand the internals of the system 1810, the programmer's task is simplified by merely having to learn the interface to the system 1810. This facilitates encapsulating the functionality of the color matching system 1810 while exposing that functionality. Similarly, the API 1800 can be employed to provide data values to the system 1810 and/or retrieve data values from the system 1810. For example, a process 1830 that processes spectrophotometric data can provide that data to the system 1810 via the API 1800 by, for example, using a call provided in the API 1800. Thus, in one example of the API 1800, a set of application program interfaces can be stored on a computer-readable medium. The interfaces can be employed by a programmer, computer component, and/or process to gain access to a color matching system 1810. Interfaces can include, but are not limited to, a first interface 1840 that communicates a spectrophotometric data, a second interface 1850 that communicates a calorimetric data, and a third interface 1860 that communicates a synthetic spectro-photometric data related to the colorimetric data communicated by interface 1850 and the spectrophotometric data communicated by the interface 1840.

The systems, methods, and objects described herein may be stored, for example, on a computer readable media. Media can include, but are not limited to, an ASIC, a CD, a DVD, a RAM, a ROM, a PROM, a disk, a carrier wave, a memory stick, and the like. Thus, an example computer readable medium can store computer executable instructions for a method for matching colors on materials with different properties. Similarly, a computer readable medium can store computer executable components of a system for matching colors on materials with different properties.

What has been described above includes several examples. It is, of course, not possible to describe every conceivable combination of components or methodologies for purposes of describing the systems, methods, computer readable media and so on employed in matching colors on materials with different properties. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

While the systems, methods and so on herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

Furthermore, to the extent that the term "includes" is employed in the detailed description or the claims, it is intended to be inclusive in a manner similar to the term "comprising" as that term is interpreted when employed as a transitional word in a claim. Further still, to the extent that the term "or" is employed in the claims (e.g., A or B) it is intended to mean "A or B or both". When the author intends to indicate "only A or B but not both", then the author will employ the term "A or B but not both". Thus, use of the term "or" herein is the inclusive, and not the exclusive, use. See BRYAN A. GARNER, A DICTIONARY OF MODERN LEGAL USAGE 624 (2d Ed. 1995).

What is claimed is:

1. A system for matching colors on materials with different properties, comprising:
   a display;
   a data store that stores one or more digital representations of materials with different properties; and
   a computer component programmed to execute a program embodied on a computer readable medium, the program being configured to:
      receive spectrophotometric data;
      access one or more digital representations from the data store;
      generate one or more images by applying the spectrophotometric data to the one or more digital representations;
      display the one or more images on the display;
      receive colorimetric data associated with the one or more images displayed on the display; and
      compute synthetic reflectance curves that facilitate matching colors on materials with different properties.

2. The system of claim 1, where the spectrophotometric data is acquired from an actual physical sample colored to a desired color.

3. The system of claim 1, where the display is a cathode ray tube display.

4. The system of claim 1, where the data store is a database.

5. The system of claim 1, where the computer component comprises a single computer.

6. The system of claim 1, where the computer component comprises two or more communicating, co-operating computer components.

7. A system for matching colors on materials with different properties, comprising:
   a spectrophotometer;
   a colorimeter;
   a display;
   an image data store that stores one or more digital representations of materials with different properties;
   a computer component in data communication with the spectrophotometer, the colorimeter, the display, and the image data store, where the computer component is programmed to execute a program embodied on a computer readable medium, the program being configured to:
      receive spectrophotometric data from the spectrophotometer;
      access one or more digital representations from the image data store;
      generate one or more images by applying the spectrophotometric data to the one or more digital representations;
      display the one or more images on the display;
      receive calorimetric data associated with the one or more images displayed on the display from the calorimeter; and
      compute synthetic reflectance curves that facilitate matching colors on materials with different properties.

8. The system of claim 7, comprising:
   a formula data store that stores one or more formulae for one or more colorants; and
   a formulator that receives the synthetic reflectance curves and produces a formula for a colorant, where the formula that is produced is derived, at least in part, from a formula stored in the formula data store.

9. The system of claim 8, where the colorant is one or more of an ink, a dye, a pigment, and a paint.

10. A method for matching colors on materials with different properties, comprising:
    acquiring spectrophotometric data;
    acquiring a digital image of a first simulated substrate;
    generating a first image to display, where the first image comprises the first simulated substrate colored according to the spectrophotometric data;
    displaying the first image;
    acquiring first colorimetric data associated with the first displayed image;
    acquiring a digital image of a second simulated substrate;
    generating a second image to display, where the second image comprises the second simulated substrate colored according to the spectrophotometric data;
    displaying the second image;
    acquiring second colorimetric data associated with the second displayed image;
    comparing the first colorimetric data with the second colorimetric data; and
    computing synthetic reflectance curves of a color that when employed to color the second simulated substrate make the display of the second simulated substrate substantially identical to the display of the first simulated substrate as colored with the spectrophotometric data.

11. The method of claim 10, comprising: computing a formula for a colorant, where the colorant, when applied to a second material, will make the second material appear to have substantially the same color as a first material.

12. The method of claim 11, where the colorant is one or more of an ink, a dye, a pigment, and a paint.

13. A system for matching colors on materials with different properties, comprising:
    means for characterizing a color of a physical reference sample;
    means for displaying a first simulation of the color of the physical reference sample;
    means for acquiring calorimetric data associated with the first simulation;
    means for generating a second simulation that represents a simulated substrate colored according to the characterizing of the color of the physical reference sample;
    means for displaying the second simulation;
    means for acquiring colorimetric data associated with the second simulation;
    means for comparing the colorimetric data associated with the first simulation and the colorimetric data associated with the second simulation; and
    means for producing spectral reflectance curves that resolve color differences identified by the means for comparing.

14. A set of application programming interfaces embodied on a computer readable medium for execution by a computer component in conjunction with a system that matches colors on materials with different properties, comprising:
    a first interface for communicating spectrophotometric data;
    a second interface for communicating colorimetric data; and
    a third interface for communicating synthetic spectrophotometric data,
    where the first interface, the second interface, and the third interface provide the computer component with access to the system that matches colors.

15. A computer readable medium containing an executable program that performs the steps of:
    processing spectrophotometric data associated with a physical reference sample;
    generating an image from a stored digital image of a substrate and the spectrophotometric data;
    processing colorimetric data associated with two or more images generated from said stored digital image of a substrate and the spectrophotometric data; and
    generating synthetic reflectance curves that resolve color differences between the two or more images.

16. A data packet for transmitting color matching data between various computer components associated with matching colors on materials with different properties, comprising:
    a first field that stores spectrophotometric data associated with a reference sample;
    one or more second fields that store colorimetric data associated with digital images of substrates colored according to the spectrophotometric data; and
    one or more third fields that store synthetic spectrophotometric data associated with resolving color differences between the calorimetric data.

* * * * *